Dec. 21, 1948.  A. LATERNSER  2,456,713
PRESSURE MEASURING INSTRUMENT
Filed May 14, 1946  2 Sheets-Sheet 1

INVENTOR
Albin Laternser
BY Morgan, Finnegan and Pinham
ATTORNEYS

Dec. 21, 1948. A. LATERNSER 2,456,713
PRESSURE MEASURING INSTRUMENT
Filed May 14, 1946 2 Sheets-Sheet 2
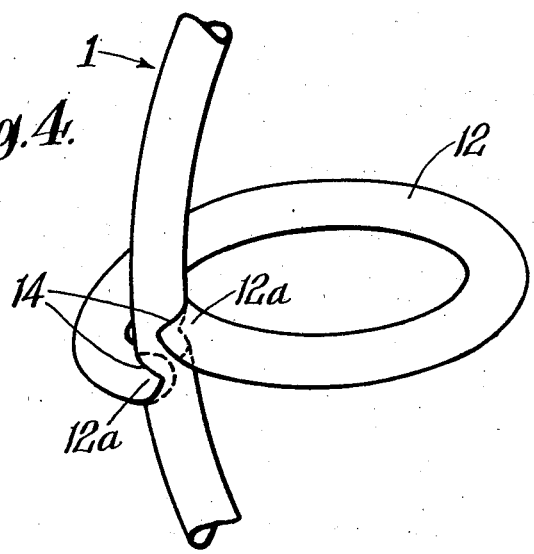
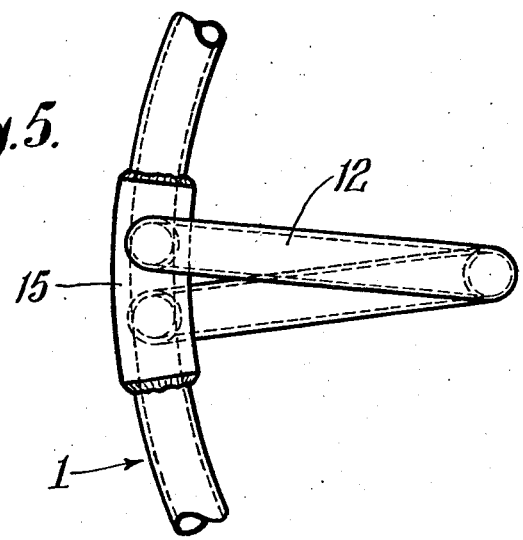
INVENTOR
Albin Laternser
BY
Morgan, Finnegan and Durham
ATTORNEYS Patented Dec. 21, 1948

2,456,713

UNITED STATES PATENT OFFICE 2,456,713

PRESSURE MEASURING INSTRUMENT

Albin Laternser, Horgen, Switzerland, assignor to Landis & Gyr, A. G., a body corporate of Switzerland Application May 14, 1946, Serial No. 669,691 In Switzerland June 27, 1945

5 Claims. (Cl. 73—405)

The present invention relates to a novel and improved ring balance particularly adapted for measuring differences in gas or vapor pressure.

The present invention has for its object the provision of a novel and improved ring balance of simplified construction having a wide range of sensitivity for small effective pressure differences. A further object of the invention is the provision of a ring balance providing for a wider range of pressure differences, and for particular accuracy at low ranges. The invention further provides a ring balance having a range of sensitivity equal to or exceeding that of a float quantity meter, without the inconveniences attendant upon the use of such float quantity meters. The invention further provides an improved means for measuring relatively small pressure differences at extremely high static pressures.

Other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 4 is a fragmentary perspective view showing a modified form of the invention; and Figure 5 is a fragmentary elevation of an additional modification of the invention.

Figure 1:
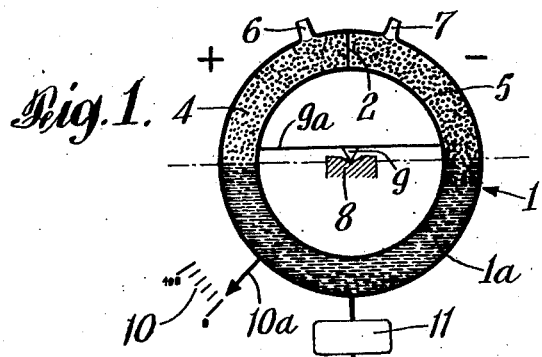
Figure 1 is a diagrammatic view illustrating the principle of a ring balance.

Ring balances are useful for measuring differences in the static pressure of a fluid, gas or vapor, and are advantageous by reason of the ease with which the range of measurement of the instrument can be varied. As shown in Figure 1 of the drawing, a ring balance 1 comprises an annular chamber of uniform cross section having a partition 2 dividing the upper half of the annular chamber into two parts 4 and 5 which communicate with the ports or couplings 6 and 7. At approximately the center of the ring is mounted a knife edge pivot 9 supported by the strut 9a, the pivot resting in the seat 8. Approximately the lower half of the annular chamber is filled with a liquid 1a which is considerably heavier than the liquid, gas or vapor whose pressure is to be measured, this liquid being preferably nonvolatile. Diametrically opposite the partition 2, is a rod 11a rigidly fastened to and extending downwardly from the tube on which rod is carried a counterweight 11 which can be fixed at a variable distance from the pivot 9. At one side of the counterweight 11, preferably at about 45° therefrom, is a pointer 10a also rigidly fastened to the tube and cooperating with the scale 10 to provide for the direct reading of the pressure difference between the ports 6 and 7. As the pressure at port 6 is incurred, the liquid 1a is pushed downwardly in the chamber 4 and rises a corresponding amount in the chamber 5, thereby causing the ring 1 to rotate in a clockwise direction carrying with it the pointer 10a upwardly on the scale 10. Such a ring balance can effectively serve to extract the square root of the pressure differential existing between the ports 6 and 7, and its accuracy is usually limited to the range between 15% and 100% of the full range of the instrument.

According to the present invention, the ring body forming part of the ring balance is provided with a greatly enlarged portion in the horizontal plane of the pivot or knife edge, which enlargement preferably takes the form of a substantially horizontal loop communicating with the ring body of the balance thereby providing a relatively large mass of heavy liquid which is displaced by relatively small pressure differential, without sacrificing the extremely wide range of pressures at which the balance is sensitive.

Figure 2:
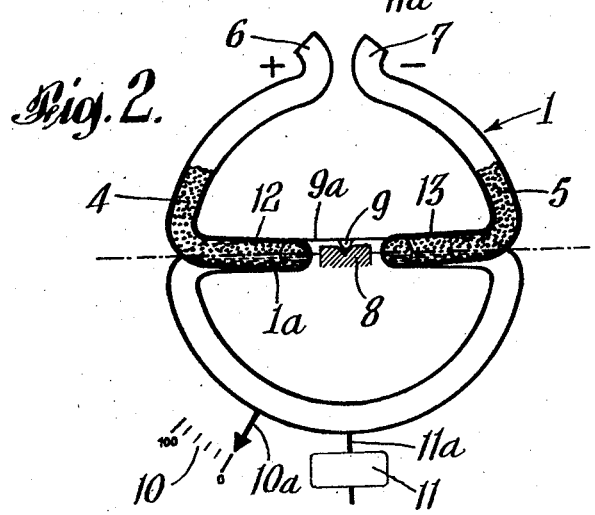
Figure 2 is a diagrammatic view, partially in section showing one embodiment of the present invention.
Figure 3:
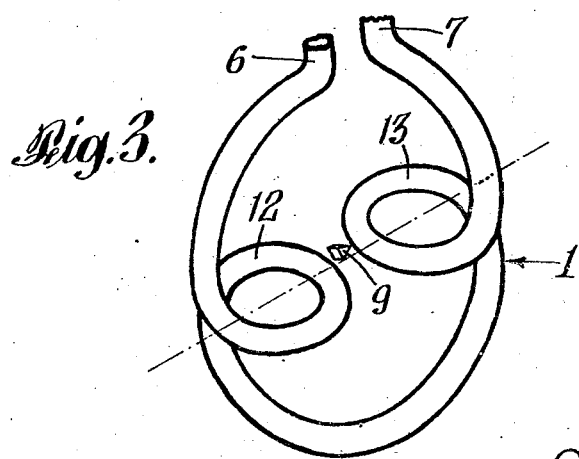
Figure 3 is a perspective view of a portion of the elements shown in Figure 2.

Referring now in detail to Figures 2 and 3 of the drawing, there is shown the present preferred and illustrative embodiment of the invention in which the ring body 1 is formed of a tube of uniform cross section terminating at its upper ends in the ports or open ends 6 and 7 at which the pressure connections are made. The lower half of the tube is formed as a semicircle, and is connected with the upper half of the tube by means of the horizontal loops 12 and 13, the entire tube being preferably formed as a single piece of bent tubing providing a continuous passageway of uniform cross sectional area from the upper open end 6 to the upper end 7. The lower half of the tube, and the lower half of each of the loops 12 and 13 is filled with the sealing liquid 1a of relatively heavy specific gravity, thereby forming a separating or sealing mass between the pressure chambers 4 and 5, as the sealing liquid in the lower half of the tube flows out into the horizontal loops and thus extends over a wider horizontal area than in the annular portion of the ring. Thereby the small difference in pressure or small difference in the rotational position of the ring causes a greater displacement of the sealing fluid to one side or the other than would occur with the plain annular ring of Figure 1. This greater displacement of sealing fluid due to the horizontal loops gives a greater trimming moment especially for relatively small quantities.

The range of the instrument is determined by the relation of the diameter of the ring body 1 to the cross-section of the loops 12 and 13. Preferably the measuring range is made to start at about 3 to 5% of the full scale reading of the balance by the relative adjustment of the diameter to the cross-section.

The form shown in Figures 2 and 3 offers very definite advantages by reason of its simplicity and inexpensiveness, the form is exceedingly compact, and due to the fact that it can be formed from a single piece of tubing without wells, it is extremely reliable in operation.

Figure 4 of the drawing shows a modified form of the invention in which the ring 1 is perforated on opposite sides, the vertical distance between the apertures 14 being about half the diameter of the tube, and the loops, for instance 12, have their ends 12a shaped to fit the tube 1 and are welded or soldered thereto. The rings 12 and 13, as in Figure 2, extend inwardly from the ring 1 directly towards the knife edge 9.

Figure 5 of the drawing shows a further modified form of the invention in which a sleeve 15 overlies and is soldered to the ring 1 and together with the ring 1 is apertured to receive and communicate with the horizontal helical loop 12 (or 13). This form of the invention is advantageous in spite of its more complex construction inasmuch as the cross sectional area of the ring body and the junctions with the loops 12 and 13 may be made equal without sacrificing the strength of the welded or soldered joints.

In all forms of the invention, varying sensitivity at low pressure differences may be provided for by varying the pitch of the helical loops 12 and 13, the greater the pitch the less being the sensitivity.

Where the ring balance is used for the measurement of differential liquid pressures, the sealing fluid, of course, is immiscible with liquid whose pressure is being measured.

The invention in its broader aspects is not limited to the specific mechanisms shown and described but departures may be made therefrom within the scope of the accompanying claims and without departing from the principles of the invention and without sacrificing its chief advantages.

What is claimed is:

1. A ring balance for measurement of small pressure differences having a hollow annulus the ends of which are uppermost and connectible to the pressures to be measured, said hollow annulus communicating at either side of its vertical center with a horizontally extending loop.

2. A ring balance as claimed in claim 1 in which the hollow annulus is a tube of uniform cross section.

3. A ring balance as claimed in claim 1 in which the horizontal loops and hollow annulus are integral and of uniform cross section.

4. A ring balance as claimed in claim 1 in which the horizontal loops and hollow annulus are of uniform cross section and the loops extend inwardly towards each other.

5. A ring balance as claimed in claim 1 in which the hollow annulus and horizontal loops are of uniform interior cross section including the junctions of the loops and tube.

ALBIN LATERNSER.

REFERENCES CITED

The following references are of record in the file of this patent:

UNITED STATES PATENTS

| Number | Name | Date |
| --- | --- | --- |
| 1,504,045 | Horton | Aug. 5, 1924 |

FOREIGN PATENTS

| Number | Country | Date |
| --- | --- | --- |
| 157,986 | Germany | Jan. 27, 1905 |
| 537,550 | Germany | Nov. 4, 1931 |